US006865557B1

(12) United States Patent
Cordery et al.

(10) Patent No.: US 6,865,557 B1
(45) **Date of Patent: *Mar. 8, 2005**

(54) NETWORK OPEN METERING SYSTEM

(75) Inventors: Robert A Cordery, Danbury, CT (US); David K. Lee, Monroe, CT (US); Steven J. Pauly, New Milford, CT (US); Leon A Pintsov, West Hartford, CT (US); David W. Riley, Easton, CT (US); Frederick W. Ryan, Jr., Oxford, CT (US); Monroe A Weiant, Jr., Trumbull, CT (US)

(73) Assignee: Pitney Bowes Inc., Stamford, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/452,404

(22) Filed: Dec. 1, 1999

Related U.S. Application Data

(63) Continuation of application No. 08/575,109, filed on Dec. 19, 1995, now Pat. No. 6,151,590.

(51) Int. Cl.[7] ................................................ G06F 17/60

(52) U.S. Cl. ........................... 705/60; 705/62; 705/407; 705/403; 705/402; 705/408; 705/410; 380/51

(58) Field of Search ........................... 705/60, 62, 402, 705/403, 407, 408, 410; 380/51

(56) References Cited

U.S. PATENT DOCUMENTS 4,253,158 A 2/1981 McFiggans .................. 380/23
4,376,299 A 3/1983 Rivest et al. ................. 380/23
4,641,347 A 2/1987 Clark et al. ..................... 380/3

(List continued on next page.)

FOREIGN PATENT DOCUMENTS

EP 0775987 A2 5/1997
GB 0540022 A2 * 5/1993 ........... G07B/17/00
WO WO 95/19016 7/1995

OTHER PUBLICATIONS

Smith, Gordon S. Embedded Device Drivers Simplify the Support of Unusual Devices Under Windows. Microsoft Systems Journal: May 1991. Retrieved from IDS.*

*Primary Examiner*—James P. Trammell
*Assistant Examiner*—James A. Reagan
(74) *Attorney, Agent, or Firm*—Charles R. Malandra, Jr.; Angelo N. Chaclas

(57) ABSTRACT

A transaction evidencing system includes a plurality of computer systems operatively configured to form a network with one of the computer systems functioning as a server and the remaining computer systems functioning as clients. Each of the computer systems includes a processor, memory and storage media. At least some of the storage means includes non-metering application programs that are selectively run on the client computer systems. An unsecured printer is operatively coupled to at least one of the computer systems for printing in accordance with the non-metering application programs. A portable vault card, which is removably coupled to the server computer system, includes digital token generation and transaction accounting processing. The client computer systems issue requests for digital tokens to the server computer system in response to requests for indicia from the non-metering application programs. The requests for digital tokens include predetermined information required by the token generation processing. The server computer system communicates with the vault card when the vault card is coupled to the server computer system, sending the requests for digital tokens to the vault card and receiving from the vault card the generated digital tokens. The server computer system sends each digital token to the client computer system that requested the digital token. The requesting client computer system generates an indicia bitmap from the digital token. The server computer system receives from the vault a transaction record that includes the digital token and the predetermined information and stores the transaction record in its storage media.

19 Claims, 8 Drawing Sheets

U.S. PATENT DOCUMENTS

| | | | | | |
|---|---|---|---|---|---|
| 4,725,718 | A | | 2/1988 | Sansone et al. | |
| 4,743,747 | A | | 5/1988 | Fougere et al. | 235/494 |
| 4,757,537 | A | | 7/1988 | Edelmann et al. | |
| 4,763,271 | A | | 8/1988 | Field | 364/466 |
| 4,775,246 | A | | 10/1988 | Edelmann et al. | |
| 4,800,506 | A | | 1/1989 | Axelrod et al. | 364/478 |
| 4,802,027 | A | | 1/1989 | Talmadge | 360/60 |
| 4,802,117 | A | | 1/1989 | Chrosny et al. | 364/900 |
| 4,802,218 | A | | 1/1989 | Wright | 380/23 |
| 4,807,059 | A | | 2/1989 | Talmadge | 360/60 |
| 4,809,185 | A | * | 2/1989 | Talmadge | 705/403 |
| 4,812,994 | A | | 3/1989 | Taylor et al. | 364/464.02 |
| 4,831,554 | A | | 5/1989 | Storace et al. | 364/464.13 |
| 4,831,555 | A | * | 5/1989 | Sansone et al. | 358/1.14 |
| 4,837,701 | A | | 6/1989 | Sansone et al. | 364/464.14 |
| 4,853,523 | A | | 8/1989 | Talmadge | 235/492 |
| 4,858,138 | A | | 8/1989 | Talmadge | 364/464.02 |
| 4,862,375 | A | | 8/1989 | Talmadge | 364/464.02 |
| 4,864,618 | A | | 9/1989 | Wright et al. | 380/51 |
| 4,868,757 | A | | 9/1989 | Gil | 364/464.03 |
| 4,873,645 | A | | 10/1989 | Hunter et al. | |
| 4,900,903 | A | | 2/1990 | Wright et al. | 235/380 |
| 4,900,904 | A | | 2/1990 | Wright et al. | 235/381 |
| 4,901,241 | A | | 2/1990 | Schneck | 364/464.02 |
| 4,908,502 | A | | 3/1990 | Jackson | 235/437 |
| 4,908,770 | A | | 3/1990 | Breault et al. | 364/464.14 |
| 4,941,091 | A | | 7/1990 | Breault et al. | 395/230 |
| 4,978,839 | A | | 12/1990 | Chen et al. | 235/375 |
| 5,065,000 | A | | 11/1991 | Pusic | 235/381 |
| 5,111,030 | A | | 5/1992 | Brasington et al. | 235/375 |
| 5,202,834 | A | | 4/1993 | Gilham | 364/464.14 |
| 5,224,046 | A | | 6/1993 | Kim et al. | 364/464 |
| 5,239,168 | A | | 8/1993 | Durst, Jr. et al. | 235/432 |
| 5,309,558 | A | | 5/1994 | Rourke et al. | 395/166 |
| 5,319,562 | A | | 6/1994 | Whitehouse | 364/464.03 |
| 5,377,268 | A | | 12/1994 | Hunter | 380/23 |
| 5,384,886 | A | | 1/1995 | Rourke | 395/147 |
| 5,390,251 | A | * | 2/1995 | Pastor et al. | 705/62 |
| 5,423,573 | A | | 6/1995 | De Passille | 283/71 |
| 5,437,441 | A | | 8/1995 | Tuhro et al. | 270/1.1 |
| 5,448,641 | A | | 9/1995 | Pintsov et al. | 380/51 |
| 5,454,038 | A | | 9/1995 | Cordery et al. | 380/51 |
| 5,510,992 | A | | 4/1996 | Kara | 364/464.02 |
| 5,583,779 | A | | 12/1996 | Naclerio et al. | 364/464.18 |
| 5,606,613 | A | | 2/1997 | Lee et al. | 380/21 |
| 5,655,023 | A | | 8/1997 | Cordery et al. | 380/51 |
| 5,696,829 | A | | 12/1997 | Cordery et al. | 380/55 |
| 5,812,991 | A | | 9/1998 | Kara | 705/410 |
| 5,822,739 | A | | 10/1998 | Kara | 705/410 |
| 6,151,590 | A | * | 11/2000 | Cordery et al. | 705/60 |

* cited by examiner

NETWORK OPEN METERING SYSTEM

This is a continuation of application Ser. No. 08/575,109 filed Dec. 19, 1995, now U.S. Pat. No. 6,151,590.

FIELD OF THE INVENTION

The present invention relates generally to value printing systems and, more particularly, to value printing systems wherein a printer is not dedicated to a metering module.

RELATED APPLICATIONS

The present application is related to the following U.S. patent applications Ser. Nos. 08/575,106, 08/575,107, 08/574,746, 08/574,745, 08/575,110, 08/574,743, 08/575, 112, 08/575,104, 08,574,749 and 08/575,111, each filed concurrently herewith, and assigned to the assignee of the present invention.

BACKGROUND OF THE INVENTION

Postage metering systems are being developed which employ digital printers to print encrypted information on a mailpiece. Such metering systems are presently categorized by the USPS as either closed systems or open systems. In a closed system, the system functionality is solely dedicated to metering activity. A closed system metering device includes a dedicated printer securely coupled to a metering or accounting function. In a closed system, since the printer is securely coupled and dedicated to the meter, printing cannot take place without accounting. In an open metering system the system functionality is not dedicated solely to metering activity. An open system metering device includes a printer that is not dedicated to the metering activity, thus freeing system functionality for multiple and diverse uses in addition to the metering activity. An open system metering device is a postage evidencing device (PED) with a non-dedicated printer that is not securely coupled to a secure accounting module.

Typically, the postage value for a mailpiece is encrypted together with other data to generate a digital token which is then used to generate a postage indicia that is printed on the mailpiece. A digital token is encrypted information that authenticates the information imprinted on a mailpiece including postal value. Examples of systems for generating and using digital tokens are described in U.S. Pat. Nos. 4,757,537, 4,831,555, 4,775,246, 4,873,645 and 4,725,718, the entire disclosures of which are hereby incorporated by reference. These systems employ an encryption algorithm to encrypt selected information to generate at least one digital token for each mailpiece. The encryption of the information provides security to prevent altering of the printed information in a manner such that any misuse of the tokens is detectable by appropriate verification procedures.

Typical information which may be encrypted as part of a digital token includes origination postal code, vendor identification, data identifying the PED, piece count, postage amount, date, and, for an open system, destination postal code. These items of information, collectively referred to as Postal Data, when encrypted with a secret key and printed on a mail piece provide a very high level of security which enables the detection of any attempted modification of a postal revenue block or a destination postal code. A postal revenue block is an image printed on a mail piece that includes the digital token used to provide evidence of postage payment. The Postal Data may be printed both in encrypted and unencrypted form in the postal revenue block.

Postal Data serves as an input to a Digital Token Transformation which is a cryptographic transformation computation that utilizes a secret key to produce digital tokens. Results of the Digital Token Transformation, i.e., digital tokens, are available only after completion of the Accounting Process.

Digital tokens are utilized in both open and closed metering systems. However, for open metering systems, the non-dedicated printer may be used to print other information in addition to the postal revenue block and may be used in activity other than postage evidencing. In an open system PED, addressee information is included in the Postal Data which is used in the generation of the digital tokens. Such use of the addressee information creates a secure link between the mailpiece and the postal revenue block and allows unambiguous authentication of the mail piece.

SUMMARY OF THE INVENTION

In accordance with the present invention an network-based open metering system is provided wherein some of the functionality typically performed in the vault of a conventional postage meter has been removed from the vault of the network-based open metering system and is performed in server and client PCs in the network. It has been discovered that this transfer of functionality from the vault to the PCs does not effect the security of the meter because the security of the network-based open metering system is in the information being processed.

Thus, the present invention provides a network-based open metering system that comprises a conventional network of a server PC and a plurality of client PC's, special Windows-based software in the server PC and each of client PC's, and a plug-in peripheral as a vault to store postage funds. The network-based meter uses the client PC's and their non-secure and non-dedicated printers to print postage on envelopes and labels at the same time it prints a recipient address. The present invention provides access to an metering system by multiple users that are geographically separated, for example at different offices within a building.

The present invention provides a network-based open meter system, which consists of a personal computer (PC) network, a digital printer operatively connected to each PC in the network, a removable electronic vault operatively connected to the server PC, an optional modem for funds recharge (debit or credit), PC software modules in the form of a Dynamic Link Library (DLL) and a user interface module in each PC. The vault is a secure encryption device for digital token generation, funds management and traditional accounting functions. The DLL module in the client initiates all communications with the DLL in the server PC which communicates with the vault, and provides an open interface to Windows-based applications. Secure communication between the client PC and the vault is desired but is not necessary for system security. The DLL module in the server PC obtains from the vault transaction records comprising digital tokens issued by the vault and associated postal data and sends the transaction record to the client PC which then generates an electronic indicia image. The usage of postal funds and the transaction record are stored in the vault. Another copy of the usage of postal funds and the transaction record may be stored on the server and client hard drives as backup. The user interface module obtains the electronic indicia image from the DLL module for printing the postal revenue block on a document, such as an envelope. The user interface also communicates with the vault via the DLL in the server PC for remote refills and for performing administrative functions.

The present invention further provides open system network metering that includes security to prevent tampering and false evidence of postage payment as well as the ability to do batch processing of envelopes, review of indicia and addressing on envelope before printing.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
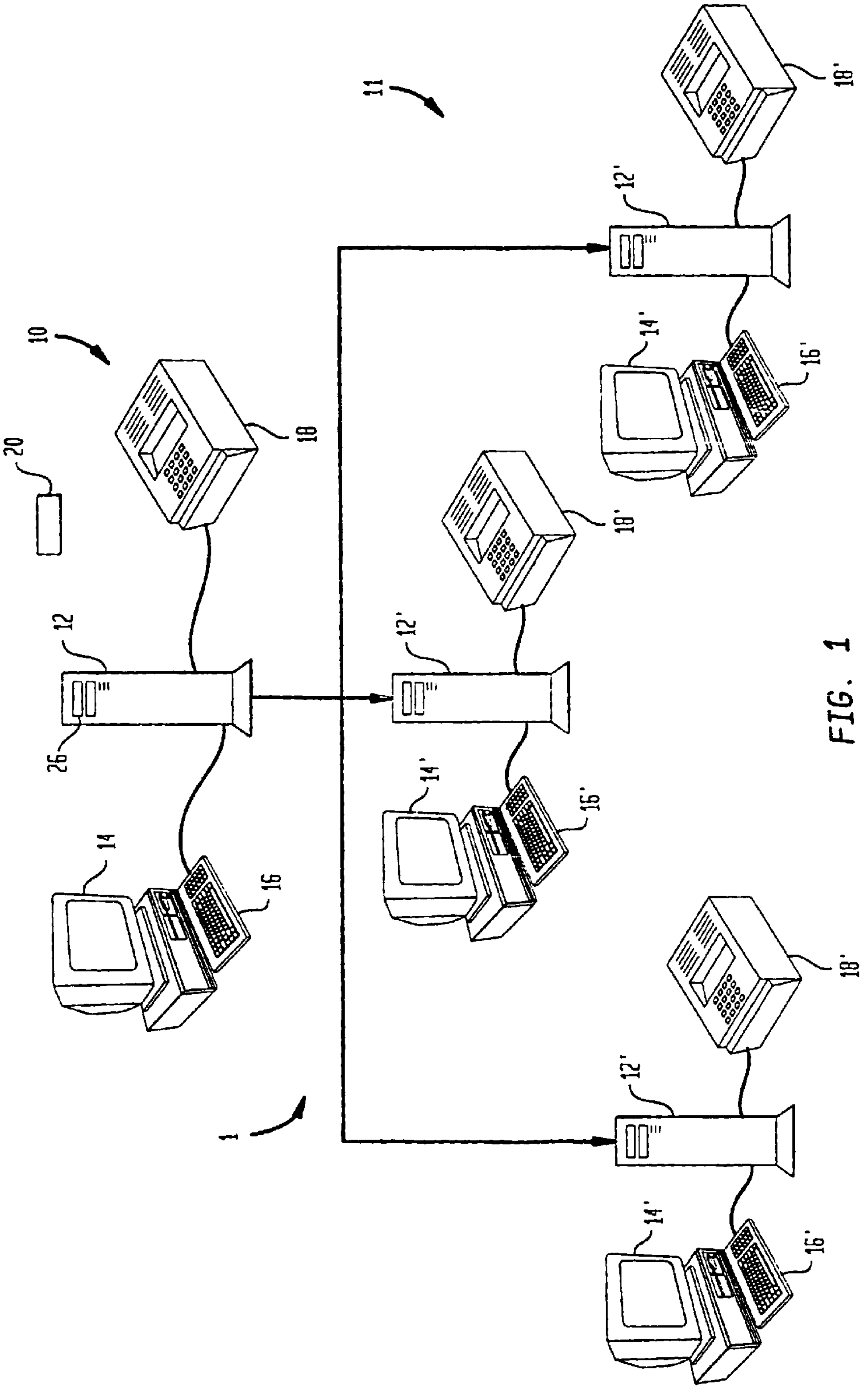
FIG. 1 is a block diagram of a PC-Network metering system in accordance with the present invention.
Figure 2:
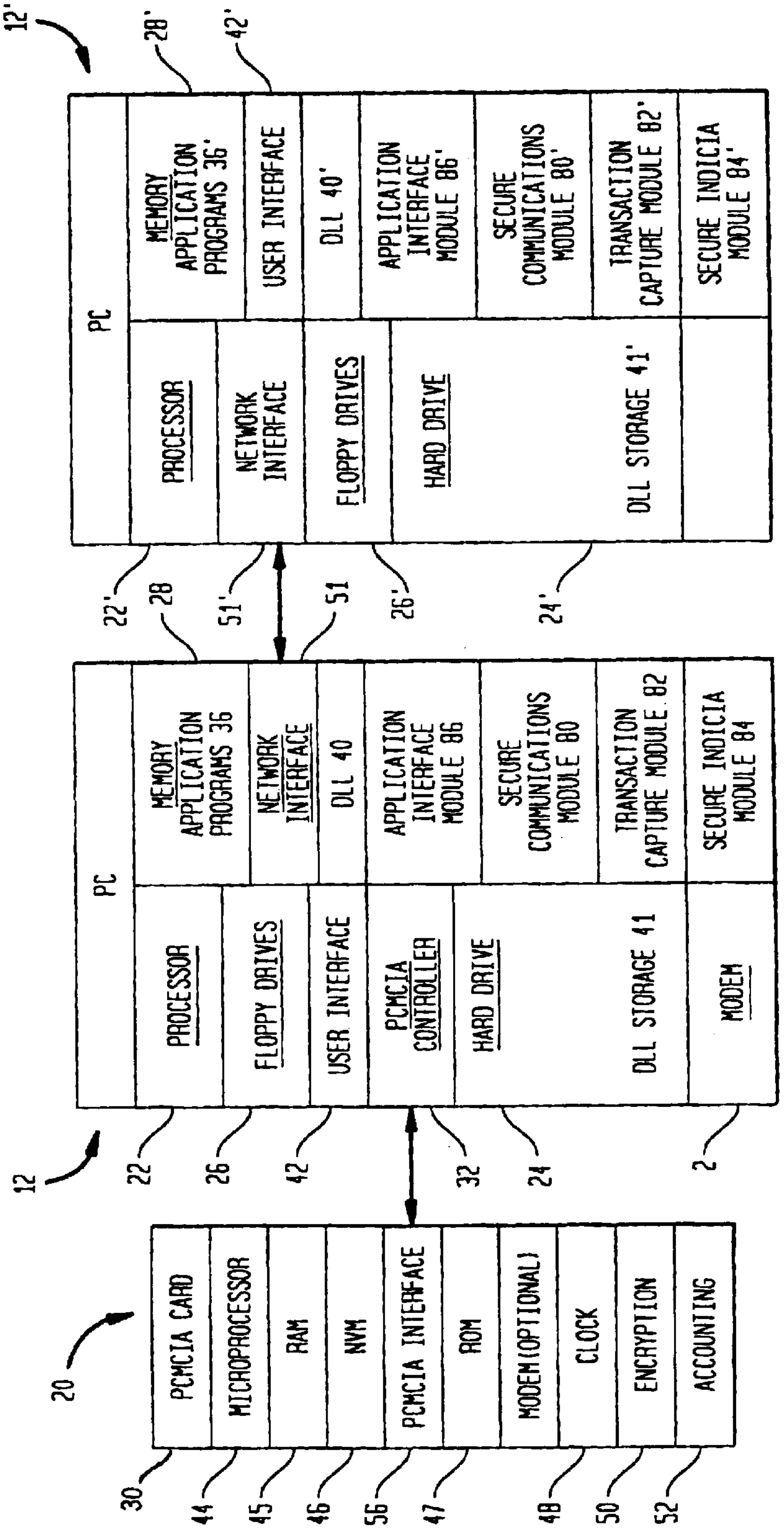
FIG. 2 is a schematic block diagram of the PC-Network metering system of FIG. 1 including a removable vault card in a server PC and a DLL in each of the PC's.
Figure 3:
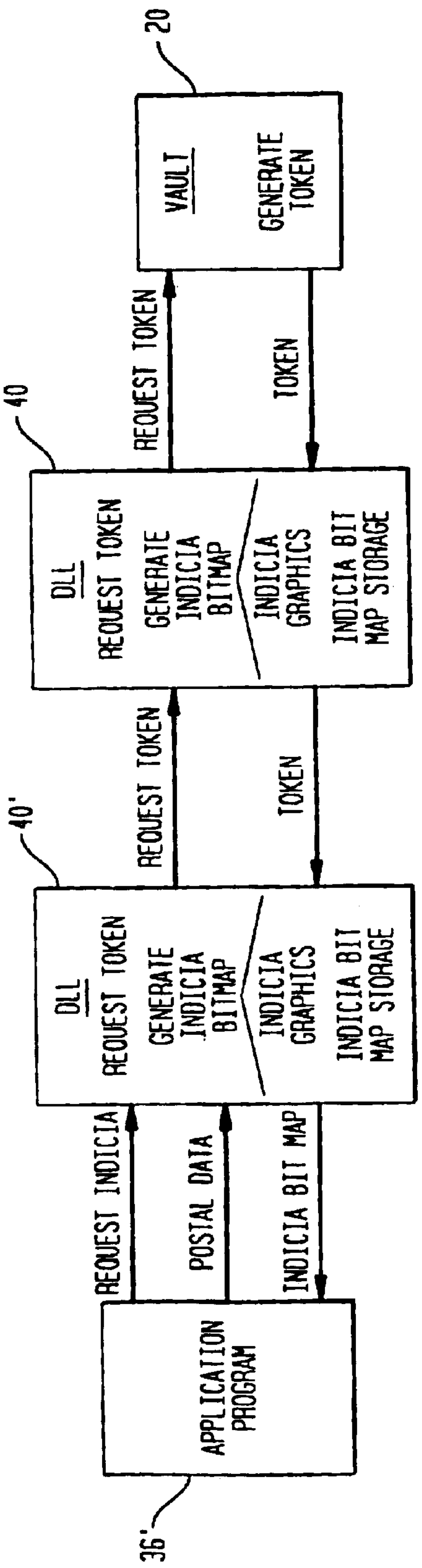
FIG. 3 is a schematic block diagram of the client and server PC's in the PC-Network metering system of FIG. 1 including interaction with the vault to generate indicia bitmap.

In describing the present invention, reference is made to the drawings, wherein there is seen in FIGS. 1–3 an open system network-based postage meter, also referred to herein as a network-based metering system, generally referred to as 1, comprising a server 10 and a plurality of clients 11. Server 10 is configured to operate as a host to a removable metering device or electronic vault, generally referred to as 20, in which postage funds are stored.

In the following description and in the drawings, components common to server 10 and clients 11 are distinguished, when necessary, by referring to the client components with a prime designation. When the component functionality is common to both server and client PC's the description does not distinguish between server and client.

The server 10 and clients 11 include the following common components: a personal computer (PC) 12, a display 14, a keyboard 16, and an unsecured digital printer 18, preferably a laser or ink-jet printer. Each PC 12 includes a conventional processor 22, such as the 80486 and Pentium processors manufactured by Intel, and conventional hard drive 24, floppy drive(s) 26, and memory 28. Server 10 includes an electronic vault 20, which is housed in a removable card, such as PCMCIA card 30. Electronic vault 20 is a secure encryption device for postage funds management, digital token generation and traditional accounting functions. Server 10 may also include an optional modem 29 which is located in PC 12, preferably, or in card 30. Modem 29 may be used for communicating with a Postal Service or a postal authenticating vendor for recharging funds (debit or credit). A description of such communication by modem is described in U.S. Pat. No. 4,831,555, incorporated herein by reference. In an alternate embodiment the modem may be located in PCMCIA card 30.

Figure 4A:
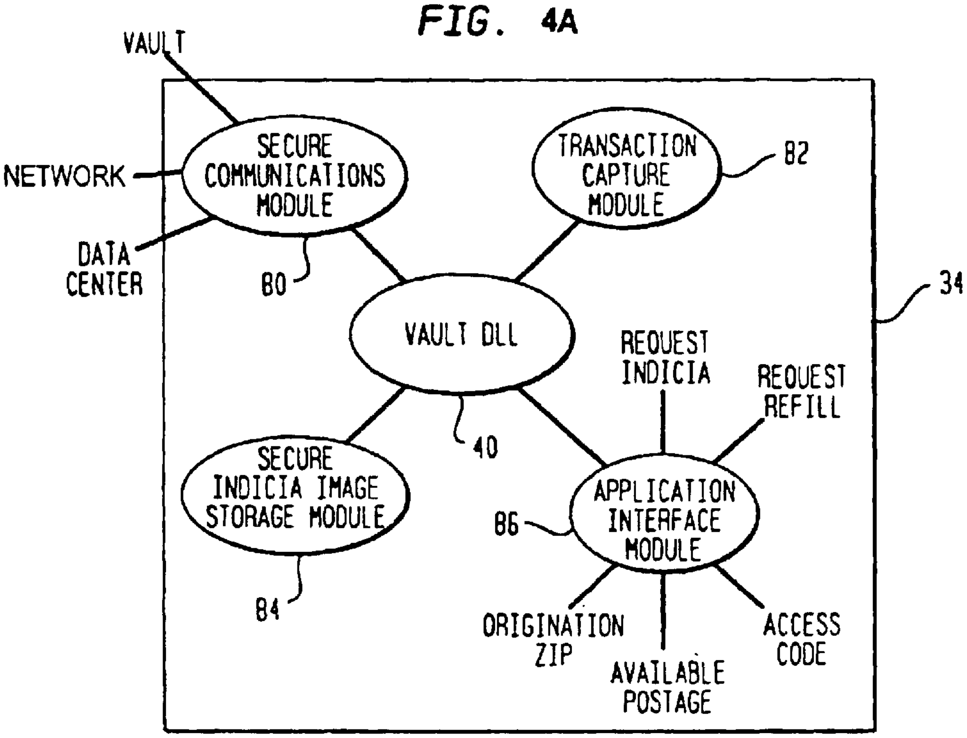
FIG. 4 (4A–4B) is a block diagram of the DLL submodules in the PC-Network metering system of FIG. 1.
Figure 4B:
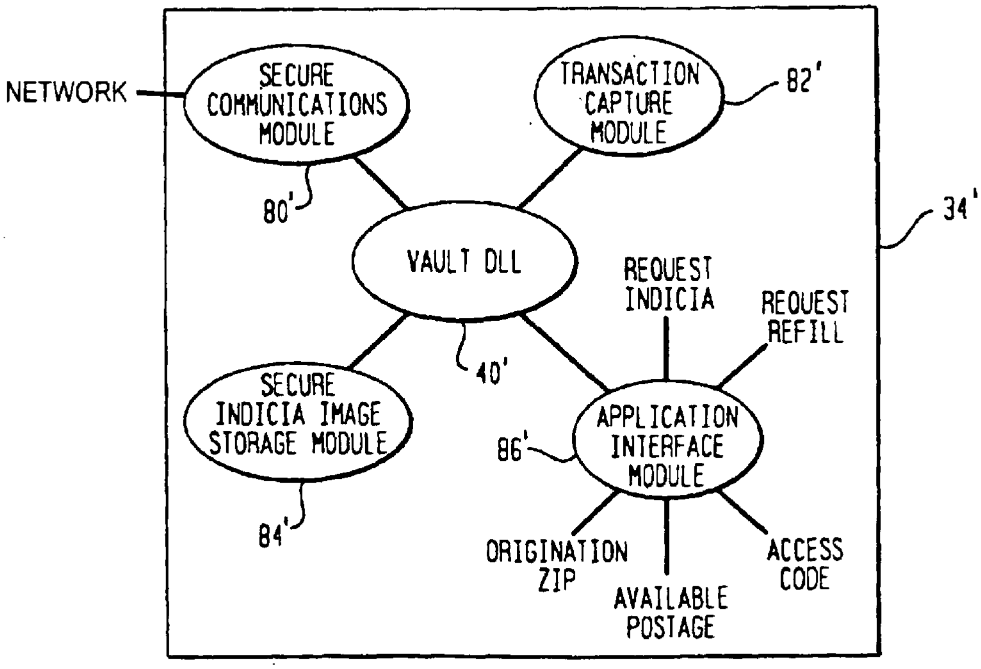

Each of the PC's 12 includes a Windows-based PC software module 34 (FIGS. 3 and 4) that is accessible from conventional Windows-based word processing, database and spreadsheet application programs 36. PC software module 34 includes a dynamic link library (DLL) 40, a user interface module 42, and a plurality of sub-modules that control the metering functions. In server 10, DLL module 40 securely communicates with vault 20 and clients 11. In client 11, DLL module 40' securely communicates with server 10. DLL 40, in server 10 and client 11, provides an open interface to Microsoft Windows-based application programs 36 through user interface module 42. DLL module 40 also securely stores transaction records reflecting the usage of postal funds of vault 20. User interface module 42 provides application programs 36 access to an electronic indicia image from DLL module 40 for printing the postal revenue block on a document, such as an envelope or label. User interface module 42 also provides application programs the capability to initiate remote refills and to perform administrative functions.

Thus, network-based metering system 1 operates as a conventional network, except that a client or network printer prints postage upon user request. Printers 18 print all documents normally printed by a personal computer, including printing letters and addressing envelopes, and in accordance with the present invention, prints postage indicia. Network-based meter system 1 uses server 10 to issue postage and one of the printers to print the issued postage on envelopes at the same time it prints a recipient's address or to print labels for pre-addressed return envelopes or large mailpieces. It will be understood that although the preferred embodiment of the present invention is described as a postage metering system, the present invention is applicable to any value metering system that includes transaction evidencing. It will also be understood that the present invention could also be used in a network in which a network printer, such as the server printer, is used to print envelopes with indicia, when local printers are not available to some or all of the client PC's.

A description of the key components of network-based metering system 1 are described below followed by a description of the preferred operation of network-based metering system 1.

The Vault

In the preferred embodiment of the present invention, the vault is housed in a PCMCIA I/O device, or card, 30 which is accessed through a PCMCIA controller 32 in server 10. A PCMCIA card is a credit card size peripheral or adapter that conforms to the standard specification of the personal Computer Memory Card International Association.

Referring now to FIGS. 2 and 3, the PCMCIA card 30 includes a microprocessor 44, non-volatile memory (NVM) 46, clock 48, an encryption module 50 and an accounting module 52. The encryption module 50 may implement the NBS Data Encryption Standard (DES) or another suitable encryption scheme. In the preferred embodiment, encryption module 50 is a software module. It will be understood that encryption module 50 could also be a separator device, such as a separate chip connected to microprocessor 44. Accounting module 52 may be EEPROM that incorporates ascending and descending registers as well as postal data, such as origination ZIP Code, vendor identification, data identifying server PC 12, sequential piece count of the postal revenue block generated by the network-based metering system 1, postage amount and the date of submission to the Postal Service. As is known, an ascending register in a metering unit records the amount of postage that has been dispensed, i.e., issued by the vault, in all transactions and the descending register records the value, i.e., amount of postage remaining in the vault, which value decreases as postage is issued.

The hardware design of the vault includes an interface 56 that communicates with the server host processor 22 through PCMCIA controller 32. Preferably, for added physical security, the components of vault 20 that perform the encryption and store the encryption keys (microprocessor 44, ROM 47 and NVM 46) are packaged in the same integrated circuit device/chip that is manufactured to be tamper proof. Such packaging ensures that the contents of NVM 46 may be read only by the encryption processor and are not accessible outside of the integrated circuit device. Alternatively, the entire card 30 could be manufactured to be tamper proof.

In accordance with the present invention, the open system vault 20 is strictly a slave device in PC 12 of server 10. Server host processor 22 generates a command and vault 20 replies with a response. Vault 20 does not generate unsolicited messages. Thus, server PC 12 requests vault status whenever any transaction is initiated. A further description of vault 20 is disclosed in the related U.S. patent Application Ser. No. 08/575,112, which is incorporated herein in its entirety by reference.

Dynamic Link Library Control of the Vault and Network Communications

In accordance with the present invention, the functionality of DLL's 40 and 40' in server and client PC's, respectively, is a key component of network-based metering 1. DLL 40 includes both executable code and data storage area 41 that is resident in hard drive 24 of PC 12. In a Windows environment, a vast majority of applications programs 36, such as word processing and spreadsheet programs, communicate with one another using one or more dynamic link libraries. The present invention encapsulates all the processes involved in metering, and provides an open interface to vault 20 from all Windows-based applications capable of using a dynamic link library. In accordance with the present invention, any client application program 36' can communicate with vault microprocessor 44 in PCMCIA card 30 through DLL 40' and server PC 12.

In accordance with the present invention, DLL 40 includes the following software sub-modules: secure communications 80, transaction captures 82, secure indicia image creation and storage 84, and application interface module 86.

Secure Communications

Figure 5:
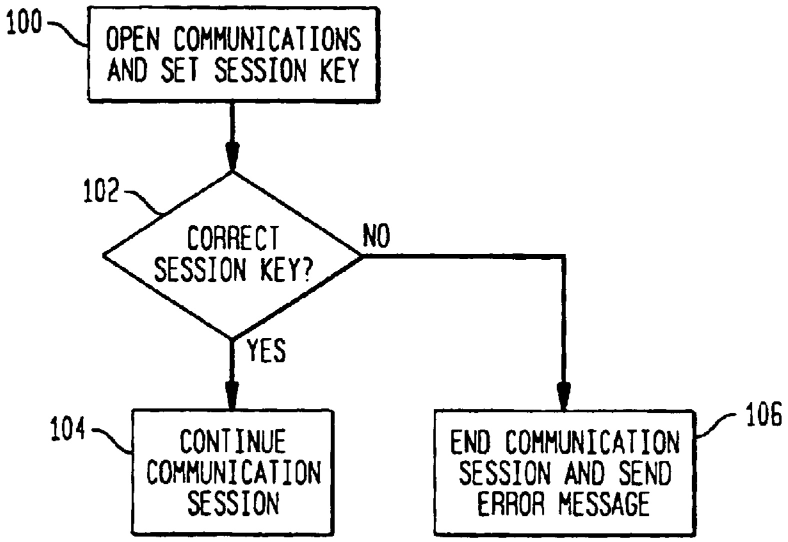
FIG. 5 is a flow chart of the Secure Communications sub-module in the PC-Network metering system of FIG. 1.

Since vault 20 is not physically secured to server PC 12, it may be possible for that one vault 20 attached to server PC 12 is replaced with another vault 20 while a vault transaction is in process. The Secure Communications sub-module 80 prevents this from happening by maintaining secure communication between server DLL 40 and vault 20. Secure Communications sub-module 80 in server 11 identifies a specific vault 20 when it opens a communication session through PCMCIA controller 32, and maintains communication data integrity with the specific vault during the entire communication session. Similarly, when a communication session is initiated between client 11 and a server 10, Secure Communications sub-module 80 maintains communication data integrity between the client 11 and server 10. Referring now to FIG. 5, when a communication session is initiated, between server DLL 40 and vault 20, or between client 11 and server 10, a session key is negotiated at step 100. All the messages thereafter are encoded/decoded using the session key which is used for only the one particular communication session. Whenever the session key changes during the communication session, the communication session terminates and an error message is sent to the user at step 106. The use of session keys is described in Applied Cryptography by Bruce Schneier, published by John Wiley and Sons, Inc., 1994. Thus, the session key not only provides secure encrypted communication during a token request and issue, but also prevents another vault (PCMCIA card 30) from replacing the vault 20 that began a communication session, because the other vault does not have the session key negotiated at the beginning of the communication session. The secure communications between server 10 and client 11 ensures that only the client requesting a token can receive the token. Secure Communications sub-module 80 in server 11 also controls secure communications with the postal data center, for example, during refills of the accounting registers in vault 20.

Transaction Captures

Figure 6:
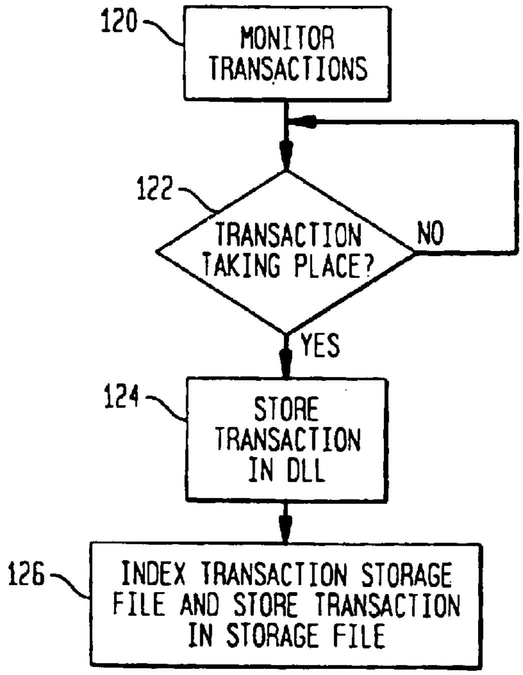
FIG. 6 is a flow chart of the Transaction Capture submodule in the PC-Network metering system of FIG. 1.

Conventional postage meters store transactions in the meter. In accordance with the present invention, Transaction Capture sub-module 82 in server 10 captures each transaction record received from vault 20 and records the transaction record in DLL 40 and in DLL storage area 41 on hard drive 24. When server 10 sends the transaction record to client 11, Transaction Capture sub-module 82' in client 11 captures the transaction record and records the transaction record in DLL 40' and in DLL storage area 41' on hard drive 24'. Referring now to FIG. 6, from the moment that a communication session is established, between server DLL 40 and vault 20, or between client 11 and server 10, respective Transaction Capture sub-modules 82 and 82' monitor message traffic at step 120, selectively capture each transaction record for token generations and refills, and store such transaction records in respective DLLs 40 and 40' at step 124 and in an invisible and write-protected files 83 and 83' in DLL storage areas 41 and 41' at step 126. The information stored for each transaction record includes, for example, vault serial number, date, piece count, postage, postal funds available (descending register), tokens, destination postal code and the block check character. A predetermined number of the most recent records initiated can be stored in this manner by indexing files 83 and 83' accordingly. In the preferred embodiment files 83 and 83' are indexed according to piece count but may searched according to addressee information. Server file 83 represents the mirror image of vault 20 at the time of the transaction except for the encryption keys and configuration parameters. Client file 83' may represent a subset of the image of vault 20 at the time of the transaction because each client 11 stores transaction records of transactions initiated by such client. Storing transaction records on hard drive 24 provides backup capability which is described below.

A description of a digital token generation process is disclosed for a PC-meter system in the related U.S. patent applications Ser. Nos. 08/575,106, 08/575,107, and 08/575, 110 which are incorporated herein in their entirety by reference. The digital token generation process for network-based metering system 1 is the same as described in the related applications except that a client application program 36' sends a request for digital token to vault 20 through client DLL 40' and server DLL 40 as shown in FIG. 3. The generated token is sent to the client DLL 40' through the server DLL 40 for use in generating an indicia. In the present invention, when a request for token is sent from a client to server 10, all postal information that is needed to calculate the token as well as parameters identifying the client, such as user ID, password and client PC identification, must accompany the request since multiple clients may be requestig tokens simultaneously.

Indicia Image Creation and Storage

In a closed metering system, such as conventional postage meters, the indicia is secure because the indicia printer is dedicated to the meter activity and is physically secured to the accounting portion of the meter, typically in a tamper-proof manner. In an open metering system, such as the present invention, such physical security is not present.

Figure 7:
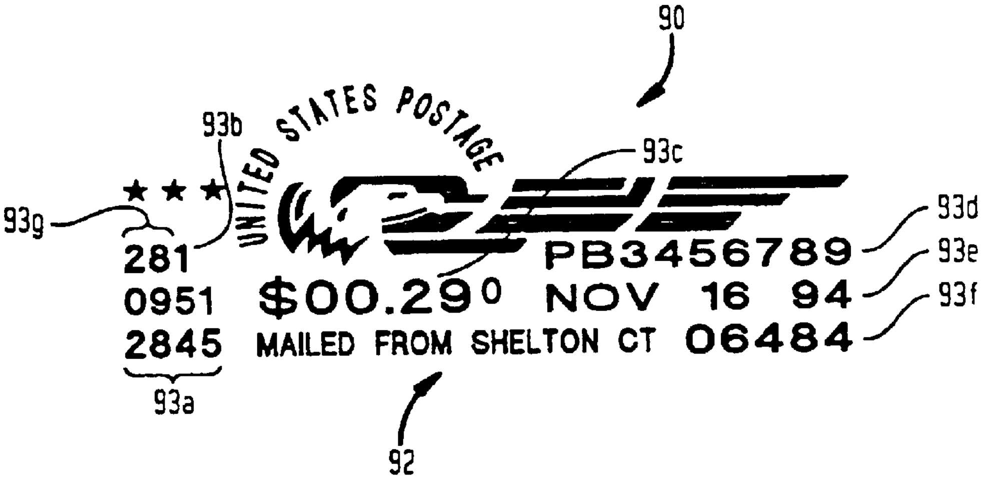
FIG. 7 is an representation of indicia printed by the PC-Network metering system of FIG. 1.

In accordance with the present invention, the entire fixed graphics image 90 of the indicia 92, shown in FIG. 7 is stored as compressed data 94 in DLL storage area 41. Postal data information, including piece count **93*a*, vendor ID 93*b*, postage amount 93*c*, serial number 93*d*, date 93*e* and origination ZIP 93*f* and tokens 93*g* are combined with the fixed graphics image 90 by Indicia Image Creation and Storage sub-module 84**.

Figure 8:
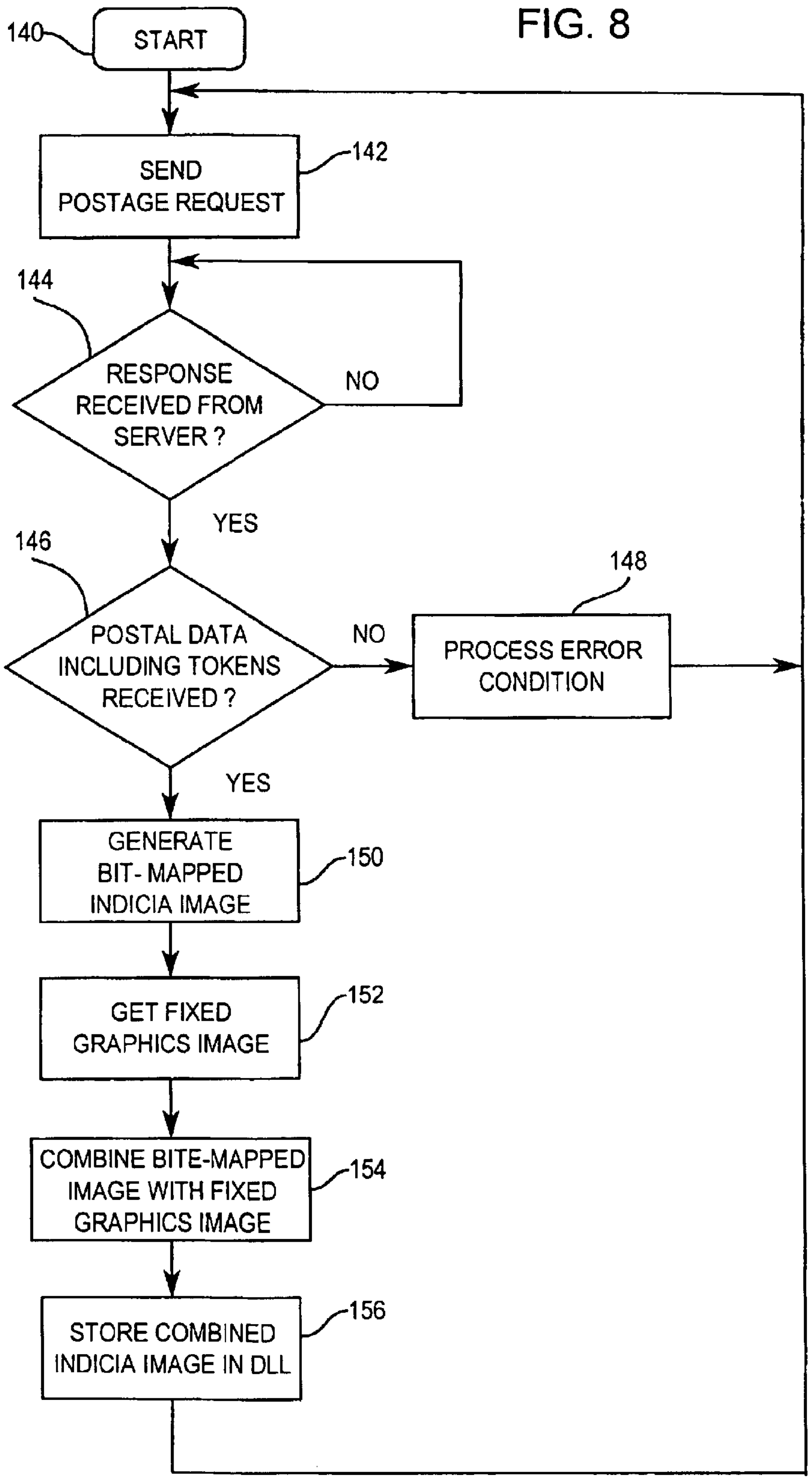
FIG. 8 is a flow chart of the client requesting an indicia in the PC-Network metering system of FIG. 1.

Referring now to FIGS. 3 and 8, a request for indicia is made, at step 142, from application program 36' in client 11 to server 10. At step 144, Secure Communications sub-module 80' in client 11 checks for a response from server 10. When a response is received, Indicia Image Creation and Storage sub-module 84' checks, at step 146, the response for postal data, including at least one digital token. If the postal data has not been sent with the response, at step 148, an error condition is processed that results in a message to the user. If the response from server 10 included the expected postal data, at step 150, Indicia Image Creation and Storage sub-module 84' generates a bit-mapped indicia image 96 by expanding the compressed fixed graphics image data 94, at step 152, and combining, at step 154, the indicia's fixed graphics image 90 with some or all of the postal data information and tokens received from vault 20. At step 156, the indicia image is stored in DLL 40' for printing. Sub-module 84' sends to the requesting application program 36' in client PC 12' the created bit-mapped indicia image 96 that is ready for printing, and then stores a transaction record comprising the digital tokens and associated postal data in DLL storage area 41'.

Thus, the bit-mapped indicia image 96 is stored in DLL 40' which can only be accessed by executable code in DLL 40'. Furthermore, only the executable code of DLL 40' can access the fixed graphics image 90 of the indicia to generate bit-mapped indicia image 96. This prevents accidental modification of the indicia because it would be very difficult for a normal user to access, intentionally or otherwise, the fixed graphics image 90 of the indicia and the bit-mapped indicia image 96.

Figure 9:
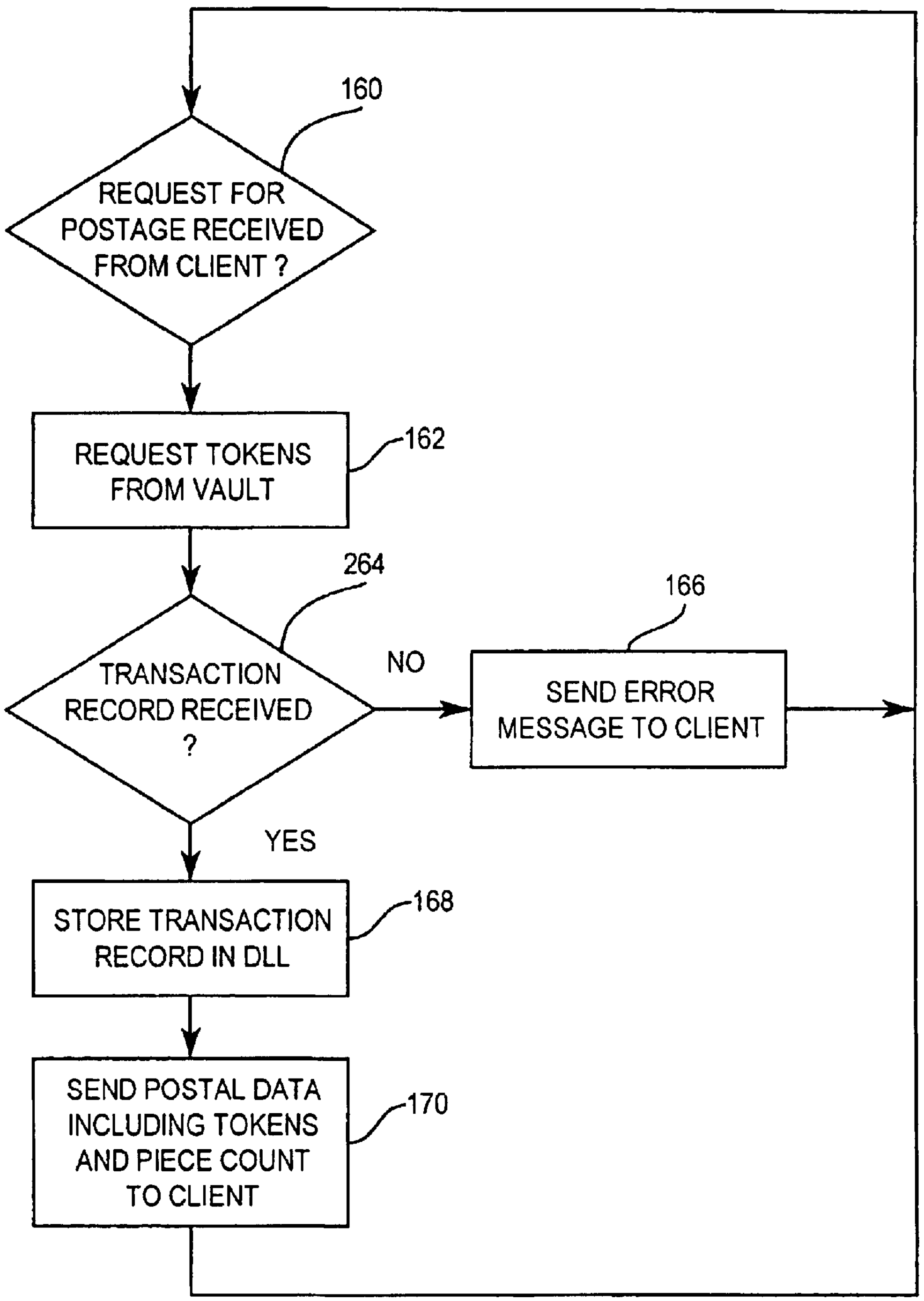
FIG. 9 is a flow diagram of the server responding to a request for an indicia in the PC-Network metering system of FIG. 1.

Referring now to FIGS. 3 and 9, when the request for indicia is made, from application program 36', Secure Communications sub-module 80 in server 10 checks for the request from client 11, at step 160. When the request is received, Secure Communications sub-module 80 requests tokens from vault 20, at step 162. At step 164, Secure Communications sub-module 80 checks for a transaction record, including digital token, from vault 20. If a transaction record is not received in response to the request from server 10, an error is processed, at step 166, resulting in an error message to client 11. If a transaction record is received, then, at step 168, the transaction record is stored in DLL 40 and DLL storage area 41. At step 170, Secure Communications sub-module 80 sends the postal data received as in the transaction record, including token and piece count, to client 11.

The request for indicia most likely will originate from a client 11 but could originate from server 10. When server 10 originates a request for indicia server 10 functions as a PC-based meter as described U.S. patent application Ser. No. 08/575,112, filed concurrently herewith, which is hereby incorporated in its entirety by reference.

Application Interface

The Application Interface sub-module 86, in server 10 or client 11, provides the following services when requested by an application program 36 in PC 12. Application program 36 accepts user data through user interface module 42 and prints an indicia on an envelope or on a label. In the preferred embodiment of the present invention, such application program 36 would be an off-the-shelf software module, such as a word processor or spreadsheet, that can access DLL 40. In an alternate embodiment application program 36 could be a software module dedicated solely to accept user data and print an indicia on an envelope or on a label. Application Interface sub-module 86 provides the destination ZIP data and associated postal data needed to create the indicia. Application Interface sub-module 86 requests available postage from vault 20 and reports the available postage to the requesting application program 36.

When vault 20 is refilled with postage funds from the data center, Application Interface sub-module 86 requests from vault 20 the access code required for refills and reports the access code received to the Secure Communications sub-module 80 which initiates communications with the data center. Application Interface sub-module 86 initiates the refill and provides the amount and combination to vault 20. DLL 40 reports the result to the requesting application program 36 which acknowledges the refill to the user.

Application Interface sub-module 86 processes a request for an indicia received from application program 36 and forwards the request to Indicia Image Creation and Storage sub-module 84. Application Interface sub-module 86 provides postal data, including date, postage, and a destination postal code, such as an 11 digit ZIP code, to Indicia Image Creation and Storage sub-module 84 which then generates a bit-mapped indicia image 96. Application Interface sub-module 86 reports to application program 36 that the bit-mapped indicia image 96 is ready for printing.

Backup On Hard Drive

Vault 20 must be a secure device because it contains the accounting information of the amount of postage remaining in the vault and the postage printed. However, the very nature of the security makes it hard to recover postal funds in the event a malfunction occurs and the vault cannot be accessed by normal operation. The present invention enhances the reliability of a PC meter system by using the hard disks of server 10 and clients 11 to backup the accounting information of the vault. As previously described, the transaction capture sub-modules 82 and 82' store transaction files as backup files on hard drives 24 and 24'. This provides a benefit that certain functions, such as account reconciliation, can be performed even when vault 20 malfunctions. Such backup is unavailable in conventional postage meters.

For further security, the backup transaction files can be encrypted before being stored on hard drives 24 and 24' to prevent tampering. The number of transactions that are maintained on hard drives 24 and 24' is limited only by the available storage space on the hard drives. Preferably, at least all transactions since the last refill would be maintained on server 10 as backup.

A detailed description of recovery from vault malfunction is disclosed in co-pending U.S. patent Application Ser. No. 08/574,743, which is incorporated herein in its entirety by reference.

Operation of the PC Meter

Generally, the first action by a user after powering up a conventional meter is setting the time and date of the meter. Setting the date is necessary to generate derived keys which are used to generate the digital tokens. (Some recent meters have a real time clock internal to the meter in which case the time and date need only be set once.) The present invention spares the user from having to set the vault date.

As previously described, vault 20 does not have an independent power source and therefore cannot have a continuous running real-time clock. The date must be set every time the vault is powered-up. Power is applied to vault 20 only when it is plugged into server PC 12. Thus, the date would normally be entered by the user through server PC 12 each time vault 20 is plugged into PCMCIA controller 32. Since server PC 12 has a real-time clock, the date setting process may be automated and made transparent to the user. In accordance with the present invention, the time and date set in server PC 12 is sent to vault 20 each time power is initially applied to vault 20. The vault date is used by DLLs 40 and 40' to generate the indicia. The vault date may be changed at any time by the user to facilitate post-dating of mail.

Upon application of power to vault 20 by PCMCIA controller 32, the date of server PC 12 is obtained through user interface 42. The date is then translated into the correct format and sent to vault 20 which then sets its date, calculates its date dependent token keys and returns its status and the token keys to server PC 12. Additionally, a default postage amount (e.g. First Class Postage) may be set in a similar manner. This method enables network-based metering system 1 immediately when vault 20 is plugged-into PCMCIA controller 32 without the user having to manually set parameters. The user may change the vault date (in order to post date mail) or the default postage amount at any time.

In an alternate embodiment, PCMCIA card 30 has its own internal clock that is automatically set with the time and date in server PC 12 each time PCMCIA card 30 is inserted into PCMCIA controller 32.

In the preferred operation, a user of an application program 36 (running in either client 11 or server 10), such as a word processor, highlights a recipient address from a letter or mailing list displayed on display 14. The user requests the printing of an envelope with indicia. A dialog box appears on display 14 indicating the default postage amount which the user may accept or modify. When the postage amount accepted, the entire envelope is previewed with all addressing, bar-coding and indicia shown on the envelope. At this point the user can print the envelope as shown or correct any errors that are seen in the preview.

As previously described, in network-based metering system 1 the printers are not dedicated to the metering function and the indicia are stored in PC 12 before printing. Thus, tokens can be generated individually or for a batch of addressees stored in the requesting client 11 which can later generate an indicia from each of the tokens and then print the indicia at the user's discretion. Such delayed printing and batch processing is described in more detail in co-pending U.S. patent Application Ser. No. 08/575,104, which is incorporated herein in its entirety by reference.

As with any document prepared in a Windows-based PC system, a user may observe, through the application program 36 in which an envelope was created, an image of a fully prepared envelope or batch of envelopes to be printed, including addressee information and indicia, before printing any of the envelopes. Network-based metering system 1 also provides a user with the ability to customize return addresses, slogans, logos and greetings that are to be printed with the indicia on the envelope.

In an alternate embodiment of network-based metering system 1, the electronic vault is in an IC token, such as manufactured by CDSM of Phoenix, Ariz., that is inserted into a token receptacle of a PCMCIA card and programmed to operate as the vault in a similar manner as described for PCMCIA card 30. In another alternate embodiment, the electronic vault is in a smart diskette, such as manufactured by SmartDisc Security Corp. of Naples, Fla., that is programmed to operate in a similar manner as described for PCMCIA card 30. In another alternate embodiment of network-based metering system 1, the electronic vault is a tamper proof, hardware peripheral, such as a dongle, that is attached to a serial, parallel or SCSI port of the PC.

As used herein, the term personal computer is used generically and refers to present and future microprocessing systems with at least one processor operatively coupled to user interface means, such as a display and keyboard, and storage media. The personal computer may be a workstation that is accessible by more than one user.

While the present invention has been disclosed and described with reference to a single embodiment thereof, it will be apparent, as noted above that variations and modifications may be made therein. It is, thus, intended in the following claims to cover each variation and modification that falls within the true spirit and scope of the present invention.

What is claimed is:

1. A postage metering system comprising:

a plurality of computers operatively connected as part of a computer network and operating as client computers on the computer network;

at least one vault device coupled to at least one of the client computers (local client computer), said vault device including unique identification, postal value storage means and digital token means;

means in said client computers for functioning as a postage metering network wherein a client computer other than the local client computer (remote client computer) requests evidence of postage payment from the vault device for concluding a postage metering transaction.

2. The system of claim 1 wherein the local client computer functions as a meter server and the remote client computer functions as a meter client on the postage metering network.

3. The system of claim 2 wherein the remote client computer initiates a postage metering transaction in the vault device by sending a request for evidence of postage payment to the local client computer, said local client computer sends the request for the evidence of postage payment to the vault device, and wherein said local client computer receives transaction information.

4. The system of claim 3 wherein the evidence of payment is generated in the vault device, is sent by the vault device to the local client computer which sends the evidence of payment to the remote client computer for subsequent printing.

5. The system of claim 3 wherein the local client computer prints the evidence of payment.

6. The system of claim 3 wherein the evidence of payment includes the postage amount and a digital token unique to the postage metering transaction.

7. The system of claim 4 wherein the remote client computer is coupled to a printer, said remote client computer causing said printer to print an indicium on a mailpiece, said indicium including the postage amount and the digital token.

8. The system of claim 3 wherein the vault device generates the digital token and performs accounting for the postage metering transaction, said local client computer storing transaction information received from the vault device.

9. The system of claim 1, further comprising:

means in the remote client computer for initiating a postage metering transaction including means for sending a request for evidence of postage payment to the local client computer;

means in said local client computer for forwarding the request for the evidence of postage payment to the vault device, means in said local client computer for receiving from the vault device transaction information including a postage amount and a digital token unique to the postage metering transaction;

means for sending at least the postage amount and the digital token to the remote client computer; and means in said remote client computer for generating an indicium bitmap, including the postage amount and the digital token, for the postage metering transaction.

10. A transaction evidencing system comprising:

a plurality of computers operatively connected as part of a computer network and operating as client computers on the computer network;

at least one security device coupled to at least one of the client computers (local client computer), said security device including unique identification, value storage means and digital token means;

means in said client computers for functioning as a transaction evidencing network wherein a client computer other than the local client computer (remote client computer) requests and obtains transaction evidencing from the security device for concluding a transaction at the remote client computer.

11. The system of claim 10 wherein the local client computer functions as a transaction server and the remote client computer functions as a transaction client on the transaction evidencing network.

12. The system of claim 11 wherein the remote client computer initiates transaction accounting in the security device by sending a request for transaction evidencing to the local client computer, said local client computer sends the request for the transaction evidencing to the security device, and wherein said local client computer receives transaction information unique to the requested transaction evidencing, said transaction information including a digital token, and wherein said local client computer sends at least the digital token to the remote client computer.

13. The system of claim 12 wherein the transaction evidencing is sent from the local client to the remote client computer for subsequent printing.

14. The system of claim 12 wherein the local client computer prints the transaction evidencing.

15. The system of claim 12 wherein the remote client computer is coupled to a printer, said remote client computer causing said printer to print evidence of the transaction, said evidence including the digital token.

16. The system of claim 12 wherein the security device generates the digital token and performs accounting for the transaction, said local client computer storing transaction information received from the security device.

17. The system of claim 14 wherein the local client computer includes means for maintaining transaction information relating to transaction evidencing processed by the security device.

18. The system of claim 10, further comprising:

means in the remote client computer for initiating a transaction including means for sending a request for a transaction evidence to the local client computer;

means in said local client computer for forwarding the request for the transaction evidence to the security device;

means in said local client computer for receiving from the security device transaction information including the transaction evidence and a digital token unique to the transaction;

means for sending at least the transaction evidence and the digital token to the remote client computer; and means in said remote client computer for generating an indicium bitmap, including the transaction evidence and the digital token, for the transaction.

19. A method for printing postage on a mailpiece using a printer coupled to a personal computer (computer), the method comprising the steps of:

connecting a plurality of computers as part of a computer network;

providing a vault device coupled to at least one of said plurality of computers, wherein the other of said plurality of computers; are remote to the vault device, the vault device being a secure processor-based accounting device that dispenses and accounts for postal value stored therein;

sending a request from the remote computer to the local computer for an amount of the postal value stored in the vault device, the request comprising postal information, including data representative of the amount of the postal value to be printed on a mailpiece by the remote computer;

dispensing the requested amount of postal value by generating in the vault device a digital token representing the requested amount and accounting for the requested amount;

sending the digital token and the transaction information from the vault device to the local computer;

sending the digital token and at least some of the transaction information from the local computer to the remote computer; and printing an indicium including the digital token on the mailpiece.

* * * * *